(12) United States Patent
Naoe

(10) Patent No.: US 11,470,223 B2
(45) Date of Patent: Oct. 11, 2022

(54) INFORMATION PROCESSING APPARATUS FOR REDUCING RISK OF RULE VIOLATION IN FILE TRANSFER

(71) Applicant: FUJIFILM BUSINESS INNOVATION CORP., Tokyo (JP)

(72) Inventor: Ken Naoe, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 0 days.

(21) Appl. No.: 17/173,330

(22) Filed: Feb. 11, 2021

(65) Prior Publication Data
US 2022/0014647 A1 Jan. 13, 2022

(30) Foreign Application Priority Data

Jul. 8, 2020 (JP) .............................. JP2020-117663

(51) Int. Cl.
*H04N 1/00* (2006.01)
*H04N 1/44* (2006.01)
*G06F 21/62* (2013.01)

(52) U.S. Cl.
CPC ......... *H04N 1/444* (2013.01); *G06F 21/6245* (2013.01); *H04N 1/00411* (2013.01); *H04N 1/00413* (2013.01)

(58) Field of Classification Search
None
See application file for complete search history.

(56) References Cited

U.S. PATENT DOCUMENTS

| | | | |
|---|---|---|---|
| 2006/0253536 A1* | 11/2006 | Fujiwara | H04N 1/00912 709/206 |
| 2013/0077119 A1* | 3/2013 | Arai | G06F 3/0488 358/1.13 |
| 2013/0088741 A1* | 4/2013 | Murata | H04N 1/00421 358/1.14 |
| 2013/0208296 A1* | 8/2013 | Yoshida | H04N 1/0048 358/1.14 |
| 2013/0222836 A1* | 8/2013 | Kakegawa | G06F 21/55 358/1.14 |
| 2017/0208196 A1* | 7/2017 | Fujii | H04N 1/00474 |
| 2017/0272594 A1* | 9/2017 | Yamada | H04N 1/0097 |
| 2018/0097946 A1* | 4/2018 | Kirihara | H04N 1/00514 |
| 2019/0014228 A1* | 1/2019 | Kamoi | G06K 15/005 |

(Continued)

FOREIGN PATENT DOCUMENTS

| | | |
|---|---|---|
| JP | 2007-179508 A | 7/2007 |
| JP | 2015-91039 A | 5/2015 |

(Continued)

*Primary Examiner* — Henok Shiferaw
(74) *Attorney, Agent, or Firm* — Oliff PLC

(57) ABSTRACT

An information processing apparatus includes a processor configured to, in a case where data to be transmitted includes one or more information items to be protected, present in an operation screen regarding data transmission an image indicating inclusion of the one or more information items to be protected, terminate presentation of the image in response to the one or more information items to be protected being excluded by a user operation, and in response to a transmission operation to transmit the data, present a warning if the transmission operation is performed while the image is presented.

16 Claims, 6 Drawing Sheets

(56) References Cited

U.S. PATENT DOCUMENTS

| | | | |
|---|---|---|---|
| 2019/0286399 A1* | 9/2019 | Niimoto | G06F 3/1285 |
| 2020/0125307 A1* | 4/2020 | Kitayama | H04N 1/00015 |
| 2020/0186657 A1* | 6/2020 | Kirihara | G06K 15/4095 |
| 2020/0412886 A1* | 12/2020 | Saito | H04L 51/08 |
| 2021/0168249 A1* | 6/2021 | Shiotani | H04N 1/0048 |

FOREIGN PATENT DOCUMENTS

| | | | |
|---|---|---|---|
| JP | 2015091039 A | * | 5/2015 |
| JP | 2018-99862 A | | 6/2018 |

\* cited by examiner

FIG. 13

| POSITION OF IMAGE PROCESSING APPARATUS | STANDBY PERIOD (T1 > T2) |
|---|---|
| INSIDE COMPANY | T1 |
| OUTSIDE COMPANY | T2 |

FIG. 14

| CURRENT TIME PERIOD | STANDBY PERIOD (T3 < T4) |
|---|---|
| DURING BUSINESS HOURS | T3 |
| OUTSIDE BUSINESS HOURS (OVERTIME HOURS) | T4 |

INFORMATION PROCESSING APPARATUS FOR REDUCING RISK OF RULE VIOLATION IN FILE TRANSFER

CROSS-REFERENCE TO RELATED APPLICATIONS

This application is based on and claims priority under 35 USC 119 from Japanese Patent Application No. 2020-117663 filed Jul. 8, 2020.

BACKGROUND

(i) Technical Field

The present disclosure relates to an information processing apparatus.

(ii) Related Art

Japanese Unexamined Patent Application Publication No. 2018-99862 describes a technology with which values each corresponding to a violation word included in print data are totaled to obtain a violation value and in response to the violation value exceeding a threshold, either processing of providing a warning or processing of canceling a print job is performed.

SUMMARY

Recent years have seen a number of rules, such as the General Data Protection Regulation (GDPR), being laid down to protect information. In the case of the GDPR, personal information is protected. To urge a user to adhere to such a rule, it is pertinent to make the user aware that the user is violating the rule.

Thus, aspects of non-limiting embodiments of the present disclosure relate to making a user more easily aware that the user is violating a rule for protecting information than in a case where information to be protected is exchanged without limitation.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to, in a case where data to be transmitted includes one or more information items to be protected, present in an operation screen regarding data transmission an image indicating inclusion of the one or more information items to be protected, terminate presentation of the image in response to the one or more information items to be protected being excluded by a user operation, and in response to a transmission operation to transmit the data, present a warning if the transmission operation is performed while the image is presented.

BRIEF DESCRIPTION OF THE DRAWINGS

An exemplary embodiment of the present disclosure will be described in detail based on the following figures, wherein:

FIG. 13 is an illustration depicting an example of a standby-period table; and

FIG. 14 is an illustration depicting another example of the standby-period table.

DETAILED DESCRIPTION

1 Exemplary Embodiment

Figure 1:
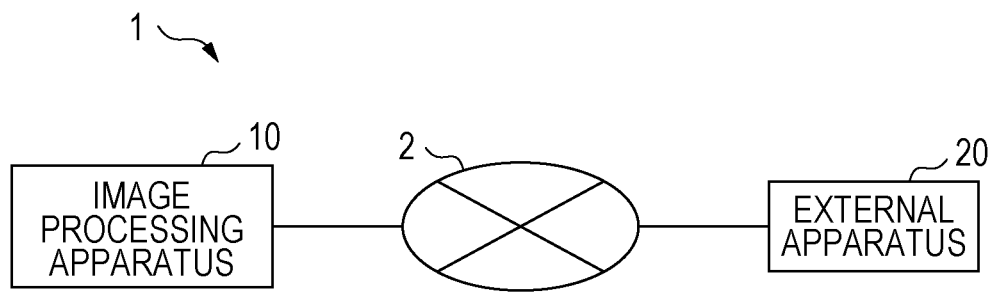
FIG. 1 is a diagram depicting an overall configuration of an information processing system according to the exemplary embodiment.

FIG. 1 depicts an overall configuration of an information processing system 1 according to an exemplary embodiment. The information processing system 1 performs various kinds of information processing. The information processing system 1 includes a communication line 2, an image processing apparatus 10, and an external apparatus 20.

The communication line 2 is a communication system including a mobile communication network, the Internet, and other networks and relays data exchanges between pieces of equipment (such as apparatuses, terminals, and systems) that communicate with the communication line 2. The image processing apparatus 10 connects to the communication line 2 via wireline communication and the external apparatus 20 connects to the communication line 2 via wireless communication. The method of communication between each apparatus and the communication line 2 is not limited to the one in the example in FIG. 1, and each apparatus and the communication line 2 may be connected to each other via wireline communication or wireless communication.

The image processing apparatus 10 performs information processing regarding images, and examples of the information processing include printing, copying, scanning, faxing, and recognizing characters. The image processing apparatus 10 transmits to the external apparatus 20, for example, image data representing an image obtained by scanning or text data representing text obtained from the image by character recognition. The external apparatus 20 receives the transmitted data and, for example, presents the content (such as imagery or text) represented by the transmitted data.

In the information processing field, a rule is sometimes laid down to protect specific information. For example, to protect personal information, the GDPR provides a rule that prohibits in principle transmission of information regarding an individual from inside the European Economic Area (EEA) to outside the EEA. The rule requires a condition such as the consent of the individual if it is absolutely necessary to transmit personal information, and the rule enforces sanctions if the rule is violated. The information processing system 1 performs processing to reduce the possibility of such sanctions being enforced.

Figure 2:
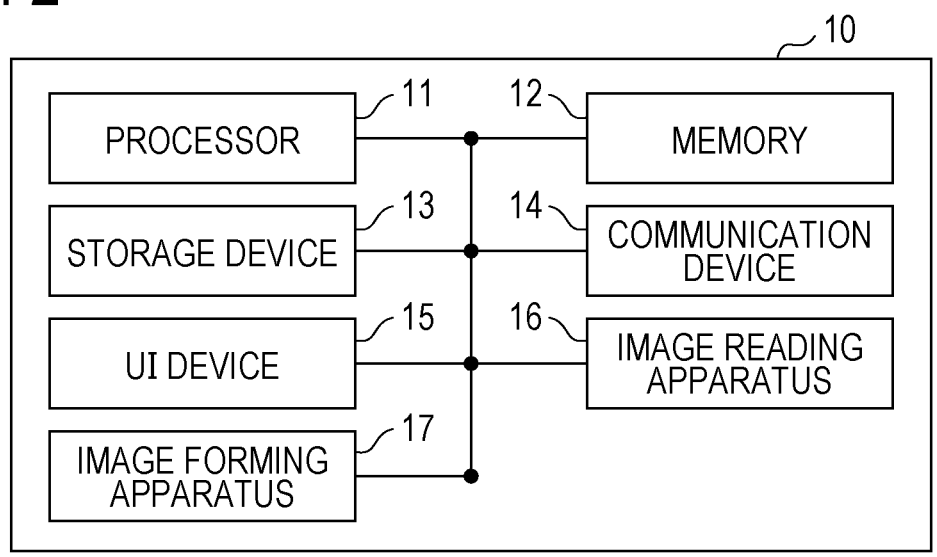
FIG. 2 is a diagram depicting a hardware configuration of an image processing apparatus.

FIG. 2 depicts a hardware configuration of the image processing apparatus 10. The image processing apparatus 10 is a computer that includes a processor 11, a memory 12, a storage device 13, a communication device 14, and a user interface (UI) device 15, an image reading apparatus 16, and an image forming apparatus 17. The processor 11 includes, for example, a computing device such as a central processing unit (CPU), a register, and a peripheral circuit. The memory 12 is a recording medium readable by the processor 11 and includes, for example, a random-access memory (RAM) and a read-only memory (ROM).

The storage device 13 is a recording medium readable by the processor 11 and includes, for example, a hard disk drive or a flash memory. The processor 11 uses the RAM as a work area and executes programs stored in the ROM and in the storage device 13, thereby controlling the operation of each piece of hardware. The communication device 14 includes, for example, an antenna and a communication circuit and is a communication unit that performs communication via the communication line 2.

The UI device 15 is an interface provided to a user who uses the image processing apparatus 10. The UI device 15, which includes, for example, a touch screen having both a display as a presentation unit and a touch panel disposed on the surface of the display, presents an image and accepts an operation by the user at the same time. The UI device 15 also includes operators including a keyboard in addition to the touch screen and accepts an operation on the operators.

The image reading apparatus 16 is a piece of hardware (so-called scanner) that reads an image presented on a medium such as a sheet of paper and is an image reading unit that reads an image on a medium placed on the image reading apparatus 16. The image forming apparatus 17 is a so-called printer that forms an image on a medium such as a sheet of paper. The image forming apparatus 17 is an image forming unit that while conveying a medium placed inside the image forming apparatus 17, forms an image on the medium by transferring and fixing the image, for example, by using an electrophotographic system.

Figure 3:
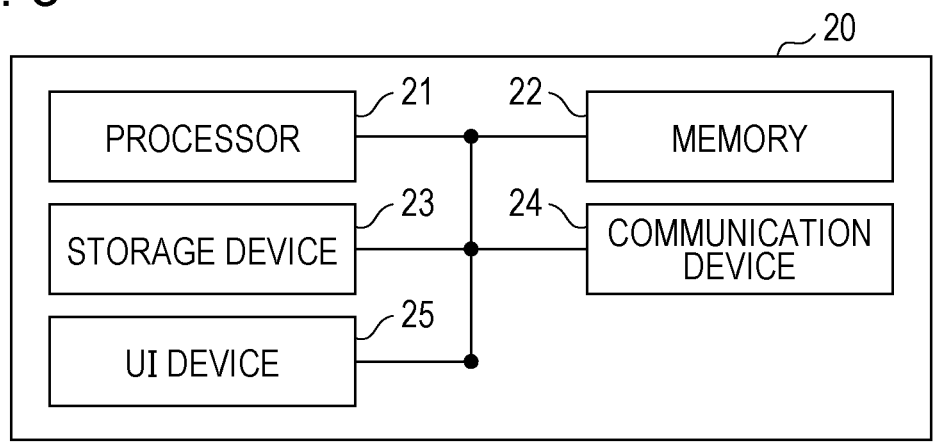
FIG. 3 is a diagram depicting a hardware configuration of an external apparatus.

FIG. 3 depicts a hardware configuration of the external apparatus 20. The external apparatus 20 is a computer that includes a processor 21, a memory 22, a storage device 23, a communication device 24, and a UI device 25. The units from the processor 21 to the UI device 25 are pieces of hardware similar to the units from the processor 11 to the UI device 15 depicted in FIG. 2.

In the information processing system 1, the processors of the apparatuses described above execute programs and control the units, thereby realizing the functions described below. An operation performed by each function is also represented as an operation performed by the processor of an apparatus that realizes the function.

Figure 4:
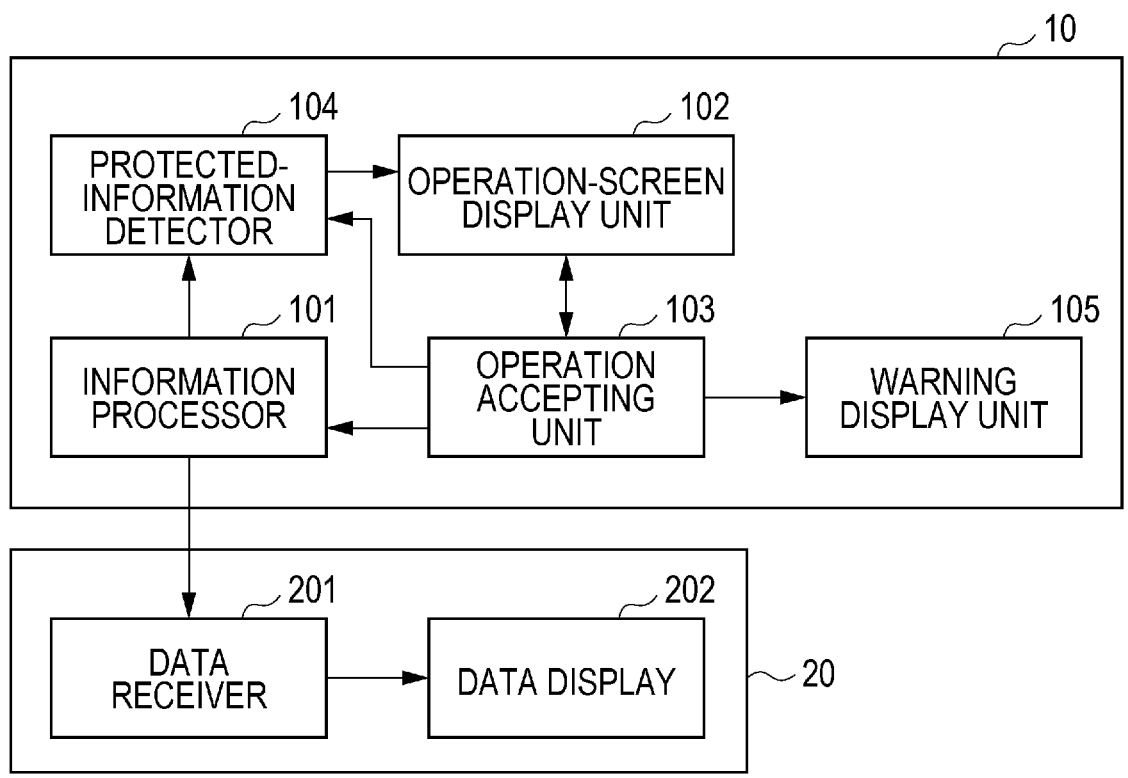
FIG. 4 is a diagram depicting a functional configuration realized with the information processing system.

FIG. 4 depicts a functional configuration realized with the information processing system 1. The image processing apparatus 10 includes an information processor 101, an operation-screen display unit 102, an operation accepting unit 103, a protected-information detector 104, and a warning display unit 105. The external apparatus 20 includes a data receiver 201 and a data display 202.

The information processor 101 of the image processing apparatus 10 performs various kinds of information processing. In the present exemplary embodiment, the information processor 101 performs image processing including a printing process, a copying process, a scanning process, a facsimile process, and a character-recognition process. The operation-screen display unit 102 presents an operation screen by which to accept an operation regarding information processing to be performed by the information processor 101.

Figure 5:
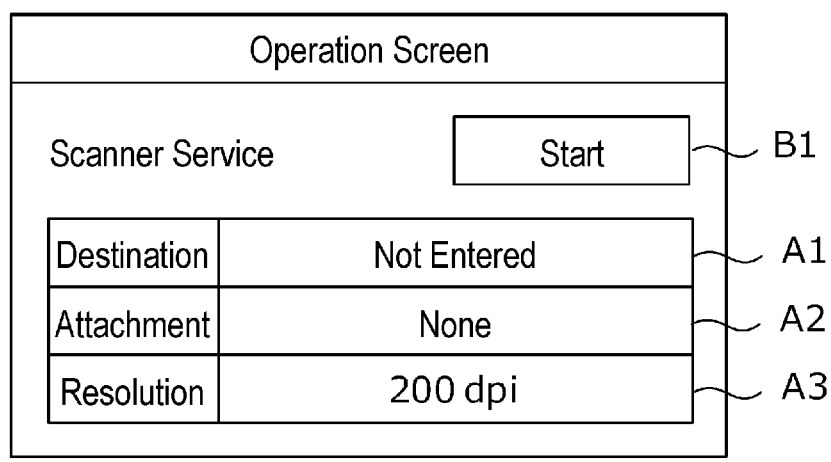
FIG. 5 is an illustration depicting an example of an operation screen that is presented.

FIG. 5 depicts an example of an operation screen that is presented. In the example in FIG. 5, the operation-screen display unit 102 presents as an operation screen for the scanner service an entry box A1 to receive a "destination", an entry box A2 to receive an "attachment", an entry box A3 to receive a "resolution", and a start button B1 to start scanning. In the example in FIG. 5, there are no entries for the destination and the attachment yet, and there is the entry "200 dpi" only for the resolution.

The operation-screen display unit 102 reports to the operation accepting unit 103 the locations of both the entry boxes and the button in the screen. With the operation screen presented by the operation-screen display unit 102, the operation accepting unit 103 accepts an operation regarding information processing to be performed by the information processor 101. The operation accepting unit 103 accepts an operation at each of the reported locations as an operation on the corresponding entry box or the corresponding button. The operation accepting unit 103 accepts, for example, an entry operation on the entry box A1 and provides the operation-screen display unit 102 with the destination entered by the entry operation, which has been accepted.

The operation-screen display unit 102 presents the provided destination in the entry box A1.

Figure 6:
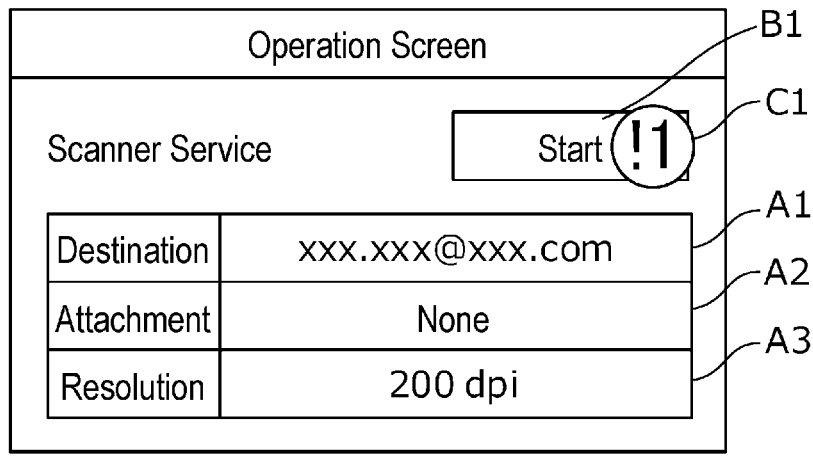
FIG. 6 is an illustration depicting an example of the operation screen, into which a destination has been entered.

FIG. 6 depicts an example of the operation screen, into which the destination has been entered. In the example in FIG. 6, the operation-screen display unit 102 presents the destination "xxx.xxx@xxx.com" in the entry box A1. It is assumed that the destination represents an email address of a specific individual. The operation accepting unit 103 also provides the protected-information detector 104 with the destination, which is the information entered into the operation screen.

If data to be transmitted includes information to be protected, the protected-information detector 104 detects the information to be protected. In the present exemplary embodiment, the information to be protected is personal information. Personal information includes a name, a date of birth, and a place of residence and is information by which an individual can be specified. If the data to be transmitted is document data representing character strings, the protected-information detector 104 detects personal information in the character strings in the document that are represented by the document data.

The protected-information detector 104 stores character strings used to represent a name and a place of residence and detects such character strings in the character strings in the document. In addition, the protected-information detector 104 stores character strings and numerals used to represent a date of birth (for example, a two-digit number for the day, the name of the month, and a four-digit number starting with 18, 19 or 20 for the year) and detects the character strings and numerals as a date of birth if these character strings and numerals are arranged in a predetermined order.

Further, if the data to be transmitted is image data, the protected-information detector 104 recognizes character strings in the image represented by the image data and detects personal information in the recognized character strings. Personal information is detected in the character strings in the way described above. In the example in FIG. 6, the protected-information detector 104 detects the destination "xxx.xxx@xxx.com", which is the email address of a specific individual, as personal information, which is to be protected.

In response to the detection of one or more information items to be protected, the protected-information detector 104 provides the operation-screen display unit 102 with the detected one or more information items to be protected. In a case where the one or more information items to be protected are provided, namely, in a case where the data to be transmitted includes the one or more information items to be protected, the operation-screen display unit 102 presents in an operation screen regarding data transmission an image indicating the inclusion of the information to be protected. This image is an image reporting the inclusion of the information to be protected and is referred to as a "protection reporting image" in the following descriptions.

The operation-screen display unit 102 presents a protection reporting image in the operation screen depicted in FIG. 6, namely, the operation screen for the scanner service accompanied by data transmission, which is the operation screen regarding data transmission. In the present exemplary embodiment, the operation-screen display unit 102 presents a badge-like image C1, which is superimposed on the start button B1 as depicted in FIG. 6, as the image indicating the inclusion of the information to be protected. The operation-screen display unit 102 presents the number of information items to be protected included in the data to be transmitted.

In the example in FIG. 6, since only the destination is included as an information item to be protected, the operation-screen display unit 102 presents the badge-like image C1 having the numeral "1". It is assumed that the entry box A2 further receives an entry at this time.

Figure 7:
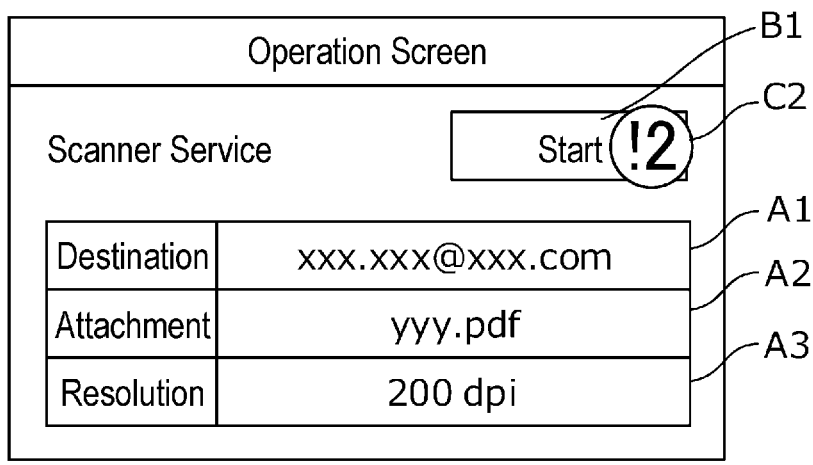
FIG. 7 is an illustration depicting an example of the operation screen, into which an attachment has been entered.

FIG. 7 depicts an example of the operation screen, into which an attachment has been entered. In the example in FIG. 7, the operation-screen display unit 102 presents the attachment "yyy.pdf" in the entry box A2.

The operation accepting unit 103 provides the protected-information detector 104 with the attachment, which is the information entered into the operation screen. If personal information is detected in the character strings included in the attachment, which is document data, the protected-information detector 104 detects the attachment as an information item to be protected. The protected-information detector 104 provides the operation-screen display unit 102 with the detected attachment as an information item to be protected. In this case, the operation-screen display unit 102 also presents in the operation screen regarding data transmission the image indicating the inclusion of the information to be protected.

In the example in FIG. 7, the operation-screen display unit 102 presents a badge-like image C2 having the numeral "2". In this way, the operation-screen display unit 102 presents the number of one or more information items to be protected included in the data to be transmitted, and if an operation in the operation screen causes a change in the one or more information items to be protected, the operation-screen display unit 102 updates the presentation to indicate the number of one or more information items to be protected after the change. As an example, it is assumed in the example in FIG. 7 that an operation is performed to replace the attachment with an attachment having no personal information.

Figure 8:
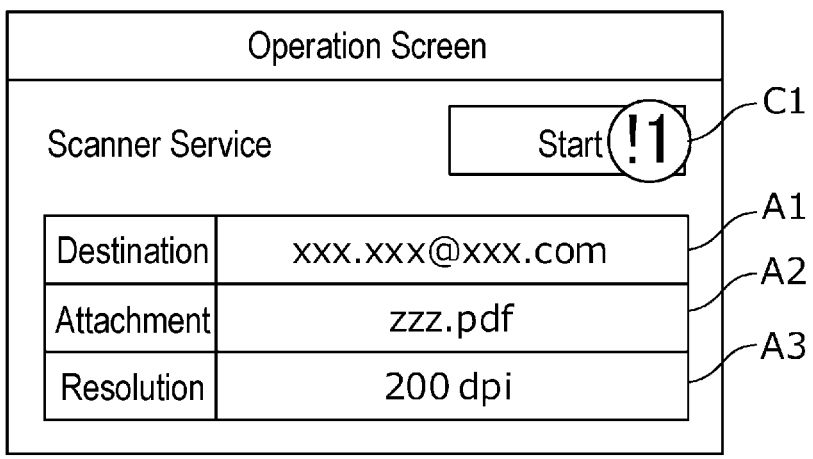
FIG. 8 is an illustration depicting an example of the operation screen, in which the attachment has been replaced.

FIG. 8 depicts an example of the operation screen, in which the attachment has been replaced. In the example in FIG. 8, the operation-screen display unit 102 presents the attachment "zzz.pdf" in the entry box A2. Since zzz.pdf does not include personal information, the protected-information detector 104 notifies the operation-screen display unit 102 that the attachment is no longer information to be protected. The operation-screen display unit 102 presents the badge-like image C1 having the numeral "1" again as depicted in FIG. 8 in response to the notification being received and thereby updates the presentation to indicate the number of information item to be protected after the change.

In the example in FIG. 8, further, it is assumed that the destination is changed from the email address of the specific individual to the main email address used, for example, by an organization or the like.

Figure 9:
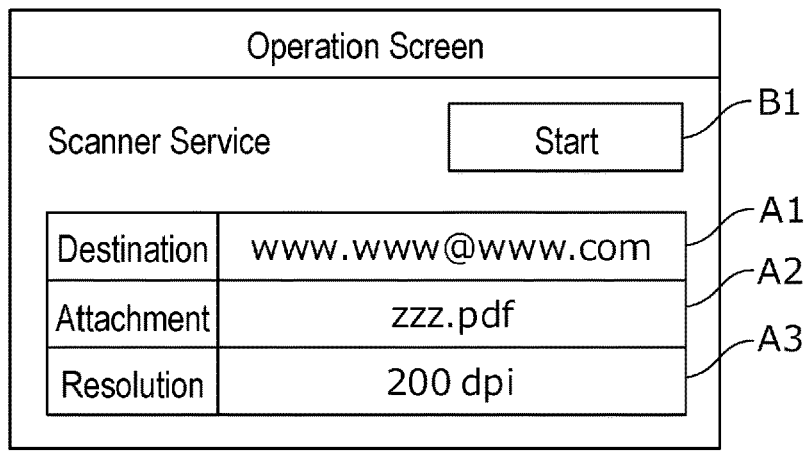
FIG. 9 is an illustration depicting an example of the operation screen, in which the destination has been changed.

FIG. 9 depicts an example of the operation screen, in which the destination has been changed. In the example in FIG. 9, the operation-screen display unit 102 presents the destination "www.www@www.com", which is the main email address, in the entry box A1.

Since the main email address does not include personal information, the protected-information detector 104 notifies the operation-screen display unit 102 that the destination no longer includes information to be protected. The operation-screen display unit 102 terminates the presentation of a badge-like image as depicted in FIG. 9 in response to the notification being received, namely, in response to the information to be protected being excluded by a user operation. If the entries are changed so that the badge-like image disappears from the screen in this way and scanning is thereafter started, the data obtained by scanning and transmitted does not include information to be protected.

In some cases, while the badge-like image is presented, the information processing system 1 receives an operation to start data transmission (for example, an operation of pressing the start button B1 for scanning). In such a case, the operation accepting unit 103 notifies the warning display unit 105 that an operation has been accepted to start information processing including data transmission. The warning display unit 105 presents a warning in response to the notification being received, namely, in response to an operation to transmit the data, the operation being performed while the badge-like image is presented.

Figure 10:
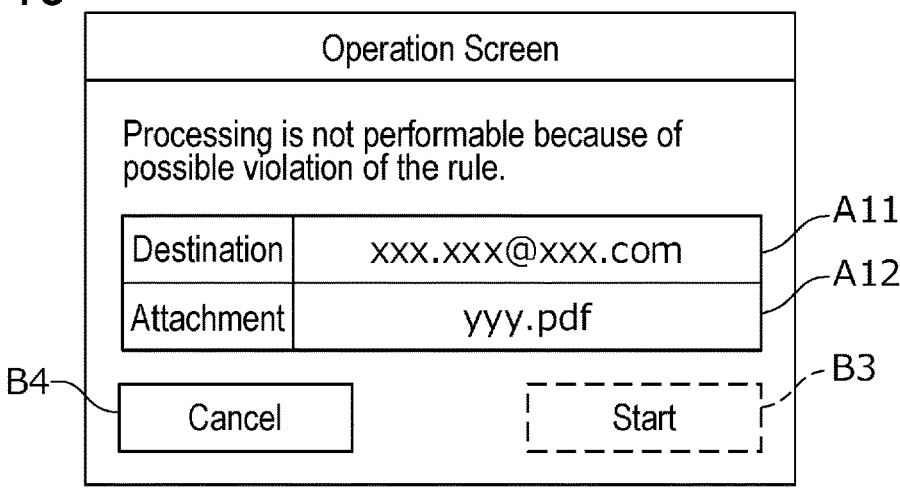
FIG. 10 is an illustration depicting an example of a presented warning.

FIG. 10 depicts an example of a presented warning. In the example in FIG. 10, the warning display unit 105 presents the character strings "Processing is not performable because of possible violation of the rule.", which represents the warning. It is assumed that FIG. 10 depicts an example of the warning presented in response to the start button B1 being pressed in the operation screen depicted in FIG. 7. In this case, the warning display unit 105 presents the entry box A11 displaying the destination, which is the detected information item to be protected, and the entry box A12 displaying the attachment, which is the other detected information item to be protected.

In this way, the warning display unit 105 presents a list of information items to be protected in response to an operation to start data transmission in a case where the operation is performed while the badge-like image is presented. The operation is an example of a "specific operation" according to the present disclosure. At this time, the warning display unit 105 presents a start button B3 for the processing in an inoperable manner and a cancel button B4 for the processing in an operable manner.

Then, the operation accepting unit 103 accepts entry operations on the entry box A11 and on the entry box A12 as operations to replace the presented information items to be protected. The warning display unit 105 presents the start button B3 for the processing in an operable manner in response to the presented information items to be protected being replaced with information items to be unprotected, which are individually entered into the entry box A11 and the entry box A12 by an operation by the user.

Figure 11:
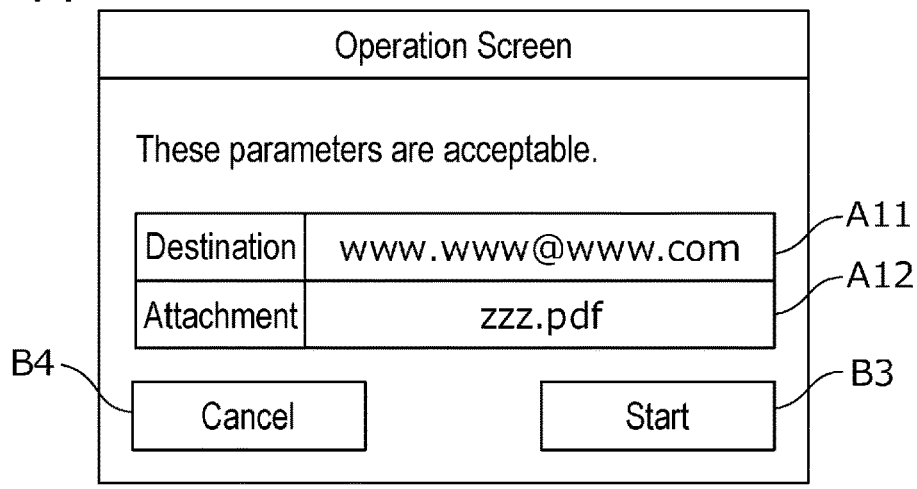
FIG. 11 is an illustration depicting an example of the operation screen, in which the start button has become operable.

FIG. 11 depicts an example of the operation screen, in which the start button B3 has become operable. In the example in FIG. 11, the entry box A11 and the entry box A12 have received the destination and the attachment depicted in FIG. 9, respectively. In this case, the warning display unit 105 presents the character strings "These parameters are acceptable.", which indicate that the warning has been canceled, and both the start button B3 for the processing and the cancel button B4 for the processing in an operable manner.

The term "parameters" mentioned here indicates the information items that are entered, such as the destination and the attachment. The information processor 101 cancels the information processing in response to an operation of pressing the cancel button B4 and performs the information processing in response to an operation of pressing the start button B3. In this way, in the present exemplary embodiment, since the information processor 101 is incapable of accepting an operation of pressing the start button B3 during a period while information to be protected is included, data transmission is not performed during the period.

Data transmitted by the information processor 101 is received by the data receiver 201 of the external apparatus 20. The data receiver 201 provides the received data to the data display 202. The data display 202 presents the provided data, which is data that does not include information to be protected.

The image processing apparatus 10, which has the configuration described above, performs risk-reduction processing to reduce a risk accompanying data transmission.

Figure 12:
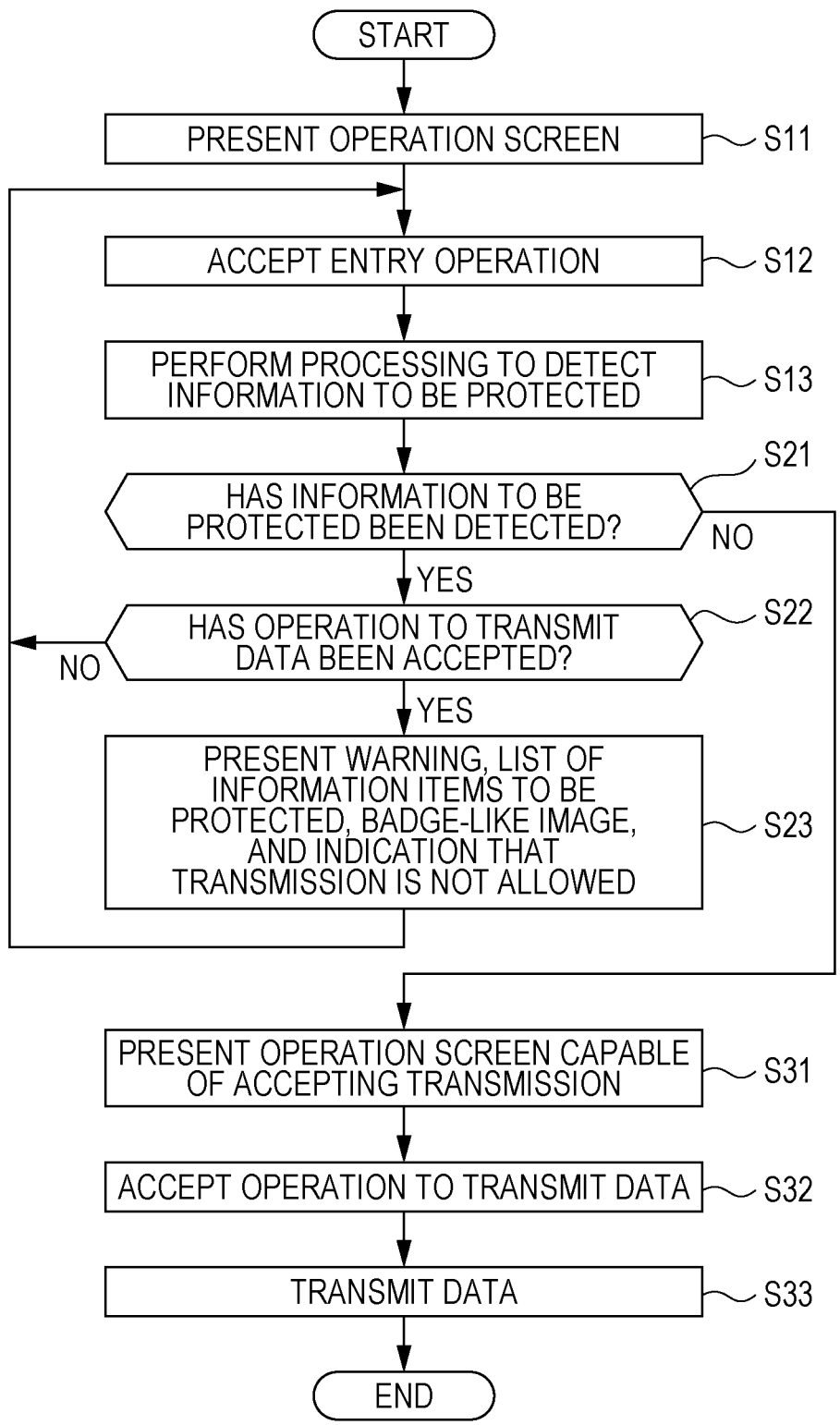
FIG. 12 is an illustration depicting an example of an operation procedure of risk-reduction processing.

FIG. 12 depicts an example of an operation procedure of the risk-reduction processing. First, the image processing apparatus 10 (the operation-screen display unit 102) presents an operation screen by which to accept an operation regarding information processing to be performed by the image processing apparatus 10 (step S11).

Next, the image processing apparatus 10 (the operation accepting unit 103) accepts in the presented operation screen an operation regarding information processing to be performed by the information processor 101 (step S12). In the example in FIG. 12, it is assumed that an operation regarding the information processing accompanied by data transmission is accepted. Subsequently, if data to be transmitted includes information to be protected, the image processing apparatus 10 (the protected-information detector 104) performs processing to detect the information to be protected (step S13).

Next, the image processing apparatus 10 determines whether information to be protected has been detected in step S13 (step S21). Upon determining that information to be protected has been detected (YES in step S21), the image processing apparatus 10 next determines whether an operation to transmit the data has been accepted (step S22). Upon determining that an operation to transmit the data has not been accepted (NO in step S22), the image processing apparatus 10 returns to step S12 and performs the action in step S12 (accepts an entry operation).

Upon determining that an operation to transmit the data has been accepted in step S22 (YES in step S22), the image processing apparatus 10 (the warning display unit 105) presents a warning, a list of information items to be protected, a badge-like image, and an indication that the transmission operation is not allowed (step S23). While presenting these items, the image processing apparatus 10 returns to step S12 and performs the action in step S12 (accepts an entry operation).

Upon determining in step S21 that information to be protected has not been detected (NO in step S21), the image processing apparatus 10 presents an operation screen capable of accepting an operation to transmit the data (step S31). Next, the image processing apparatus 10 (the operation accepting unit 103) accepts an operation to transmit the data in the operation screen presented in step S31 (step S32). Then, the image processing apparatus 10 (the information processor 101) transmits the data in accordance with the accepted transmission operation (step S33).

As described above, in the present exemplary embodiment, in response to an operation to transmit the data, a warning is presented if the operation is performed while a badge-like image is presented, and the badge-like image indicates that information to be protected is included. Thus, a user is more easily aware that the user is violating a rule for protecting information than in a case where information to be protected is exchanged without limitation.

In addition, in the present exemplary embodiment, while data to be transmitted includes information to be protected, the data is not transmitted. Thus, transmission of information to be protected, which violates the rule, can be avoided. Further, in the present exemplary embodiment, a badge-like image indicating the number of information items to be protected is presented. Thus, a user who understands what the badge-like image represents grasps that the data to be transmitted includes information items to be protected and also grasps the number of the information items to be protected.

2 Modifications

The exemplary embodiment described above is only an example in which to embody the present disclosure and may be modified as described below. In addition, the exemplary embodiment and modifications may be combined with each other as necessary and executed.

2-1 Information to be Protected

In the exemplary embodiment, personal information specified by the GDPR is the information to be protected, but this is not meant be limiting. For example, confidential information specified by a company rule may be the information to be protected. Alternatively, information classified as untransferable by a usage rule of an information processing service may be the information to be protected. Furthermore, not only information contained in a document or a paper but also setting information for processing may be the information to be protected.

2-2 Protection Reporting Image

In the exemplary embodiment, a badge-like image depicted in FIG. 6 and other Figures is used as a protection reporting image, but this is not meant to be limiting. For example, a color, a thickness, a font, or the like that differs from that of information to be unprotected may be used as a protection reporting image.

2-3 Protection Reporting Image

In the exemplary embodiment, the operation-screen display unit 102 presents a protection reporting image whenever information to be protected is detected, but this is not meant to be limiting. The operation-screen display unit 102 may refrain from presenting a protection reporting image, for example, in a case where data for which a warning has been presented before is to be transmitted.

The operation-screen display unit 102 stores, for example, pieces of transmitted data or information regarding the pieces of transmitted data (such as filenames and file sizes). Then, in response to the entry of a piece of data to be newly transmitted, the operation-screen display unit 102 compares the piece of data with the stored information regarding the pieces of transmitted data. If the piece of data to be newly transmitted coincides with one of the pieces of transmitted data, the operation-screen display unit 102 does not present the protection reporting image, and if the piece of data to be newly transmitted coincides with none of the pieces of transmitted data, the operation-screen display unit 102 presents the protection reporting image.

When not presenting the protection reporting image, the operation-screen display unit 102 presents an operation screen capable of accepting a transmission operation, and when presenting the protection reporting image, the operation-screen display unit 102 presents an operation screen incapable of accepting a transmission operation as in the exemplary embodiment. According to the present modification, a warning is not repeatedly presented for the same piece of data.

2-4 Automatic Processing after Warning

In the exemplary embodiment, the information processor 101 performs no processing regarding data transmission (specifically, transmitting data or canceling transmission of data) unless the user performs an operation after the warning is presented, but this is not meant to be limiting. For example, the information processor 101 may automatically perform processing regarding data transmission in a case where no operation is performed for a fixed amount of time after the warning is presented. The fixed amount of time is a period during which processing is not performed and is referred to as a "standby period" below.

The information processor 101 specifically performs as the processing regarding data transmission either the processing to transmit data or the processing to cancel transmission of data. If there is a user who spends a lot of time removing information to be protected, performing the processing to transmit data avoids exclusive use of the image processing apparatus 10 by the user for a long period and enables effective use of the image processing apparatus 10.

Examples of the processing to cancel transmission of data include the processing to switch from an operation screen presenting the start button for the processing to an operation screen not presenting the start button for the processing (such as a menu screen). Performing the processing to cancel transmission of data also avoids exclusive use of the image processing apparatus 10 by a user for a long period and enables effective use of the image processing apparatus 10. The standby period can be determined in advance but may be varied.

For example, the information processor 101 designates a period of different length as the standby period in accordance with the position of the image processing apparatus 10. The information processor 101 uses a standby-period table that associates a position of the image processing apparatus 10 with a standby period.

FIG. 13 depicts an example of the standby-period table. In the example in FIG. 13, the positions of the image processing apparatus 10 "inside company" and "outside company" are associated with the standby periods "T1" and "T2", respectively, and T2 is shorter than T1.

In the present modification, it is assumed that when the image processing apparatus 10 is placed, the positional information indicating the placement location is input into and stored in the image processing apparatus 10. In response to the operation-screen display unit 102 presenting a warning, the information processor 101 reads the positional information stored in the image processing apparatus 10 and determines whether the location of the image processing apparatus 10 indicated by the positional information that has been read is inside the company or outside the company. The information processor 101 sets the standby period at T1 and performs the processing regarding data transmission if the image processing apparatus 10 is located inside the company. The information processor 101 sets the standby period at T2 and performs the processing regarding data transmission if the image processing apparatus 10 is located outside the company.

When located outside the company, the image processing apparatus 10 is more likely to be shared with a person outside the company than when the image processing apparatus 10 is located inside the company. If a warning is presented, time is spent to remove information to be protected, and the image processing apparatus 10 is exclusively used for a longer period. A person inside the company can be tolerant of lengthy exclusive use because the apparatus is used for the company operation, but a person outside the company is likely to be less tolerant to lengthy exclusive use because the company operation is unrelated to the person outside the company.

Thus, in the present modification, a shorter standby period is set as described above when the image processing apparatus 10 is located outside the company, and a shorter period from the presentation of a warning to data transmission or cancellation of data transmission is set. In this case, causing frustration for others by lengthy exclusive use of the image processing apparatus 10 is less likely to happen than in a case where the standby period is fixed.

The information processor 101 designates a period of different length as the standby period in accordance with the current time period. The information processor 101 uses a standby-period table that associates a current time period with a standby period.

FIG. 14 depicts another example of the standby-period table. In the example in FIG. 14, the current time periods "during business hours" and "outside business hours (overtime hours)" are associated with the standby periods "T3" and "T4", respectively, and T4 is longer than T3.

In response to the operation-screen display unit 102 presenting a warning, the information processor 101 reads the current time by using a clock function provided by the image processing apparatus 10 and determines whether the current time that has been read is inside the business hours or outside the business hours. The information processor 101 sets the standby period at T3 and performs the processing regarding data transmission if the current time is inside the business hours. The information processor 101 sets the standby period at T4 and performs the processing regarding data transmission if the current time is outside the business hours.

The number of users of the image processing apparatus 10 is smaller outside the business hours than during the business hours. Thus, a longer standby period is set as described above when the current time is outside the business hours and a longer period from the presentation of a warning to data transmission or cancellation of data transmission is set. In this case, a user has ample time to handle the warning compared with a case where the standby period is fixed.

2-5 Functional Configuration

A functional configuration realized with the information processing system 1 is not limited to the configuration depicted in FIG. 4 and other Figures. For example, in the exemplary embodiment, although the operation-screen display unit 102 of the image processing apparatus 10 performs both the action to present the operation screen to accept an operation regarding the information processing and the action to present a warning, a list of information items to be protected, a badge-like image, and an indication that a transmission operation is not allowed, these actions may be performed by using separate functions.

Further, for example, the actions performed by the operation-screen display unit 102 and the operation accepting unit 103 may be performed by using a single function. In addition, the functions realized with the image processing apparatus 10 may be realized by using a computer resource provided either by more than one information processing apparatuses or in a cloud service. In other words, both the range of operation that each function performs and an apparatus to realize each function may freely be determined as long as the functions depicted in FIG. 4 and other Figures are realized in an information processing system as a whole.

2-6 Processor

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

2-7 Categories of Disclosure

The present disclosure is to be understood not only as information processing apparatuses such as the image processing apparatus and the external apparatus but also as an information processing system including the information processing apparatuses (the information processing system 1 is an example). The present disclosure is also to be understood either as an information processing method to realize processes performed by using the information processing apparatuses or as a program to cause a computer to function to control the information processing apparatuses. The program may be provided in the form of a recording medium such as an optical disc storing the program. Alternatively, the program may be provided in the form of being downloaded onto a computer via a communication line such as the Internet, installed into the computer, and made available.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
in a case where data to be transmitted includes one or more information items to be protected, present in an operation screen regarding data transmission an image indicating inclusion of the one or more information items to be protected, wherein the operation screen includes an execution-start image which, when pressed, starts execution of the data transmission, and the image is superimposed on the execution-start image,
terminate presentation of the image in response to the one or more information items to be protected being excluded by a user operation, and
in response to a user's transmission operation pressing the execution-start image, present a warning if the transmission operation is performed while the image is presented, wherein
the processor is configured to present the number of the one or more information items to be protected included in the data and if the user operation causes a change in the one or more information items to be protected, update presentation to indicate the number of the one or more information items to be protected after the change.

2. The information processing apparatus according to claim 1,
wherein the processor is configured to refrain from transmitting the data while the data includes the one or more information items to be protected.

3. The information processing apparatus according to claim 2,
wherein the processor is configured to present the number of the one or more information items to be protected included in the data and if the user operation causes a change in the one or more information items to be protected, update presentation to indicate the number of the one or more information items to be protected after the change.

4. The information processing apparatus according to claim 1,
wherein in response to a specific operation being performed, the processor is configured to present a list of the one or more information items to be protected and accept an operation to remove the one or more information items to be protected.

5. The information processing apparatus according to claim 2,
wherein in response to a specific operation being performed, the processor is configured to present a list of the one or more information items to be protected and accept an operation to remove the one or more information items to be protected.

6. The information processing apparatus according to claim 3,
wherein in response to a specific operation being performed, the processor is configured to present a list of the one or more information items to be protected and accept an operation to remove the one or more information items to be protected.

7. The information processing apparatus according to claim 1, wherein the processor is configured to refrain from presenting the image in a case where data for which a warning has been presented before is transmitted.

8. The information processing apparatus according to claim 2,
wherein the processor is configured to refrain from presenting the image in a case where data for which a warning has been presented before is transmitted.

9. The information processing apparatus according to claim 3,
wherein the processor is configured to refrain from presenting the image in a case where data for which a warning has been presented before is transmitted.

10. The information processing apparatus according to claim 4,
wherein the processor is configured to refrain from presenting the image in a case where data for which a warning has been presented before is transmitted.

11. The information processing apparatus according to claim 5,
wherein the processor is configured to refrain from presenting the image in a case where data for which a warning has been presented before is transmitted.

12. The information processing apparatus according to claim 6,
wherein the processor is configured to refrain from presenting the image in a case where data for which a warning has been presented before is transmitted.

13. The information processing apparatus according to claim 1,
wherein the processor is configured to automatically perform processing regarding transmission of the data in a case where no operation is performed for a fixed amount of time after the warning is presented.

14. The information processing apparatus according to claim 2,
wherein the processor is configured to automatically perform processing regarding transmission of the data in a case where no operation is performed for a fixed amount of time after the warning is presented.

15. The information processing apparatus according to claim 13,
wherein the processor is configured to designate a period of different length as the fixed amount of time in accordance with a current time period.

16. An information processing apparatus comprising:
a processor configured to:
in a case where data to be transmitted includes one or more information items to be protected, present in an operation screen regarding data transmission an image indicating inclusion of the one or more information items to be protected, wherein the operation screen includes an execution-start image which, when pressed, starts execution of the data transmission, and the image is superimposed on the execution-start image,
terminate presentation of the image in response to the one or more information items to be protected being excluded by a user operation, and
in response to a user's transmission operation pressing the execution-start image, present a warning if the transmission operation is performed while the image is presented, wherein:
the processor is configured to automatically perform processing regarding transmission of the data in a case where no operation is performed for a fixed amount of time after the warning is presented, and
the processor is configured to designate a period of different length as the fixed amount of time in accordance with a position of the information processing apparatus.

* * * * *